(12) United States Patent
Cano Cediel et al.

(10) Patent No.: US 7,935,290 B2
(45) Date of Patent: May 3, 2011

(54) PROCESS FOR MAKING SWAGED LIGHTING HOLES IN PLANAR AREAS OF PREIMPREGNATED COMPOSITE PARTS

(75) Inventors: David Cano Cediel, Madrid (ES); Jose Manuel Menendez Martin, Madrid (ES); Augusto Perez Pastor, Madrid (ES); Antonio Duran Quiroga, Madrid (ES); Pedro Nogueroles Vines, Toledo (ES)

(73) Assignee: Airbus Espana, S.L., Madrid (ES)

( * ) Notice: Subject to any disclaimer, the term of this patent is extended or adjusted under 35 U.S.C. 154(b) by 162 days.

(21) Appl. No.: 11/794,221

(22) PCT Filed: Dec. 26, 2005

(86) PCT No.: PCT/EP2005/057171
§ 371 (c)(1),
(2), (4) Date: Feb. 19, 2008

(87) PCT Pub. No.: WO2006/069989
PCT Pub. Date: Jul. 6, 2006

(65) Prior Publication Data
US 2009/0020217 A1      Jan. 22, 2009

(30) Foreign Application Priority Data

Dec. 30, 2004   (ES) .................................. 200403146

(51) Int. Cl.
*B29C 53/04*     (2006.01)
*B29C 70/54*     (2006.01)

(52) U.S. Cl. .......................... 264/258; 264/313; 264/319

(58) Field of Classification Search .................. 264/313, 264/330, 258, 319; 425/512
See application file for complete search history.

(56) References Cited

U.S. PATENT DOCUMENTS

| | | | | |
|---|---|---|---|---|
| 1,872,482 A | * | 8/1932 | Messing | 264/339 |
| 3,616,012 A | * | 10/1971 | Salvarani | 156/222 |
| 3,973,651 A | * | 8/1976 | Garrett et al. | 188/32 |
| 5,295,390 A | * | 3/1994 | Hosono | 72/334 |
| 5,882,462 A | * | 3/1999 | Donecker et al. | 156/205 |
| 6,254,812 B1 | * | 7/2001 | Goodridge et al. | 264/39 |
| 6,458,308 B1 | * | 10/2002 | Kato | 264/257 |
| 6,814,916 B2 | * | 11/2004 | Willden et al. | 264/257 |

FOREIGN PATENT DOCUMENTS

| | | |
|---|---|---|
| EP | 0 313 155 | 4/1989 |
| JP | 04-220327 | * 8/1992 |

* cited by examiner

*Primary Examiner* — Richard Crispino
*Assistant Examiner* — Martin Rogers
(74) *Attorney, Agent, or Firm* — Ladas & Parry LLP

(57) ABSTRACT

The invention relates to a process for making swaged lighting holes (1) in planar areas of parts (5) made of preimpregnated composite, by means of which the part (5) is arranged between a female tooling (11) with the final shape of the bottom side of the swaged part and a caul plate (19) with the final shape of the top side of the swaged part, except in an area (3) which must be swaged, pressure P1 is applied on the caul plate (19) in the area of the part (5) that must be maintained substantially planar, and pressure P2 is applied by means of a male tooling (17) on the area (3) of the part (5) which must be swaged at a forward speed allowing the flow of the resin during the slippage of the fibers of the material so that it may deform, adapting to the final shape of the female tooling (11).

4 Claims, 2 Drawing Sheets

PROCESS FOR MAKING SWAGED LIGHTING HOLES IN PLANAR AREAS OF PREIMPREGNATED COMPOSITE PARTS

FIELD OF THE INVENTION

This invention relates to a process for making swaged lighting holes in planar areas of preimpregnated composite parts, and particularly in parts made by means of automatic laying machines.

BACKGROUND OF THE INVENTION

The use of swaged lighting holes in structural parts is common in order to achieve an increase of stiffness without increasing the weight and with a minimum cost.

The processes for making swaged lighting holes on sheet metal are common in industry and achieve the desired deformation of the sheet by means of its plastic deformation.

In the case of composite parts formed with stiff continuous fibers, however the mechanism allowing the adaptation to the desired shape of the swaged lighting hole is based on the relative slippage of fibers.

In parts made with composites, the traditional process for making swaged lighting holes consists of manually laminating each layer, adapting it to the geometry of the swaged lighting hole. This process is expensive, since it is completely manual and requires the use of materials that can adapt to the complex geometry of the swaged lighting hole without forming wrinkles. The most adaptable type of material is fabric, which, compared with the tape, is more expensive and has worse structural properties.

SUMMARY OF THE INVENTION

This invention proposes a new process for achieving swaged lighting holes in planar or quasi-planar areas of laminated parts of preimpregnated composite that is particularly applicable to parts made using preimpregnated tape the laminate of which is carried out with an automatic laying machine.

Parts of this type are used quite particularly in the aeronautical industry.

The process comprises the following steps:

Arranging the part between a female tooling with the final shape of the bottom side of the swaged part and a caul plate with the final shape of the top side of the swaged part and applying pressure on the caul plate throughout the process to prevent forming wrinkles on the area of the part that must be maintained sufficiently planar. The caul plate will not act on the area of the part with the swaged lighting hole.

Applying a male tooling on the area of the part that must be swaged at a forward speed allowing flow of the resin during the slippage of the fibers of the composite such that said area can be deformed, adapting to the shape of the female tooling.

The process may additionally include the application of heat to the part while carrying out the process to achieve a temperature in the resin facilitating the slippage of the fibers of the material and a final cooling step if its handling is required immediately after making the swaged lighting hole.

Other features and advantages of this invention will be understood from the following detailed description of an illustrative embodiment of its object in relation to the attached drawings.

DETAILED DESCRIPTION OF THE INVENTION

Figure 1:
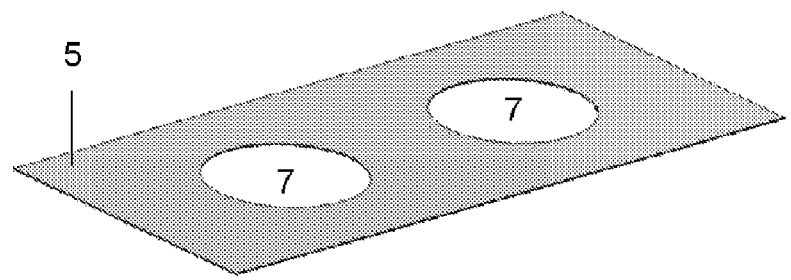
FIG. 1 shows the starting part in the process according to this invention.
Figure 2:
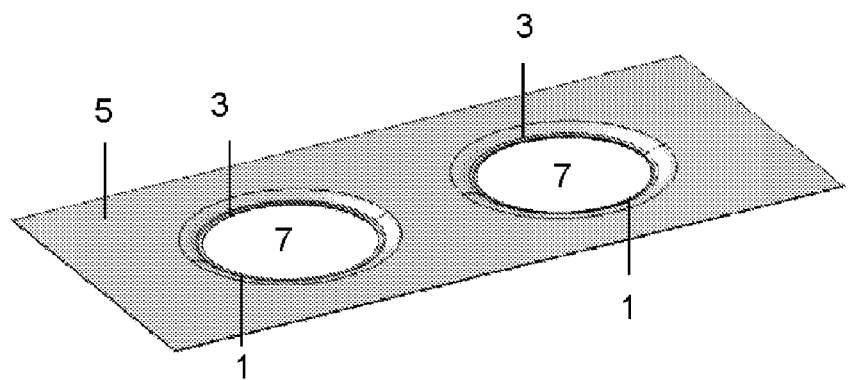
FIG. 2 shows the part of FIG. 1 after making two swaged lighting holes following the process object of this invention.

An embodiment of the process according to the invention for carrying out the swaged lighting hole 1 consisting, as is shown in the cases represented in FIGS. 2 and 3, of a recess of an area 3 of the part 5 surrounding the opening 7, with an S-shaped contour, is described below. As the person skilled in the art will understand, the swaged lighting hole may have another shape.

Figure 3:
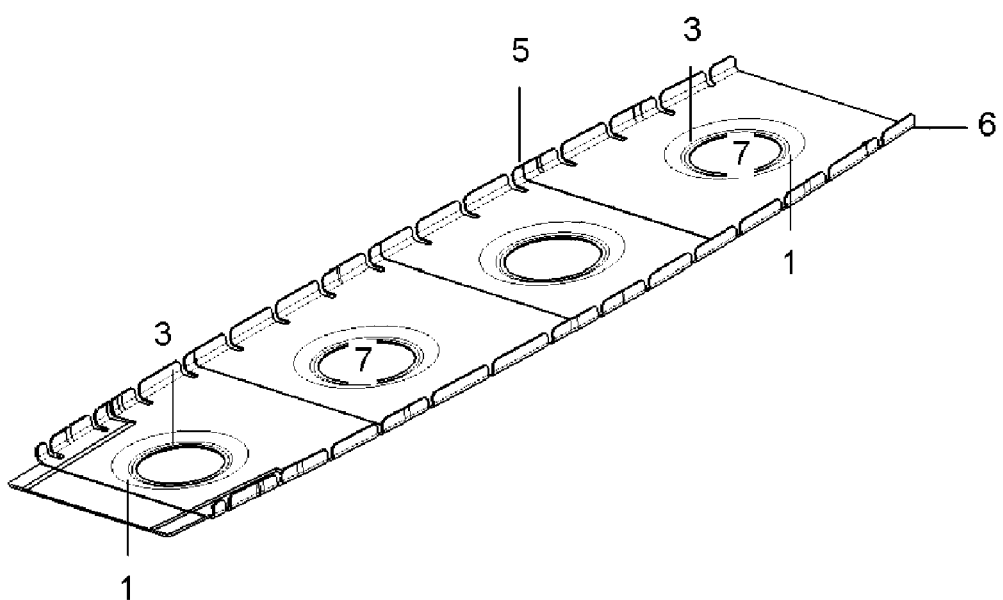
FIG. 3 shows a part in which the flanges are formed first and after that the swaged lighting holes are made following the process object of this invention.

The swaged lighting holes 3 are made in a planar or quasi-planar area of the part 5, but the latter may have a non-planar shape like the part 5 shown in FIG. 3, which corresponds to a rib with a C-shaped section, in which the flanges 6 have been formed prior to making the swaging according to this invention.

The part 5 is covered with a thin plastic film (not represented) to prevent it from adhering to the tooling of the swaged lighting hole process and is placed, suitably centering it, on a female tooling 11 the top side of which reproduces the shape that the part must be given during the swaging process, particularly including the cavity 13 with the desired shape for the swaged lighting hole 1.

A male tooling 17 and a caul plate 19 are arranged on the part 5. This caul plate 19 must cover the entire area affected by the movement that the swaging process will cause on the fibers of the composite, except in the very swaged lighting hole areas. The part 5 is therefore enclosed between the female tooling 11 and the caul plate 19, except on area 3.

The male tooling 17 is responsible for forming the part 5 with the shape of the female tooling 11, and particularly forming its area 3 with the shape of the cavity 13. The male tooling 17 must initially be lifted above the part 5, which is achieved by supporting it on the female tooling 11 by means of springs 15.

Figure 4:
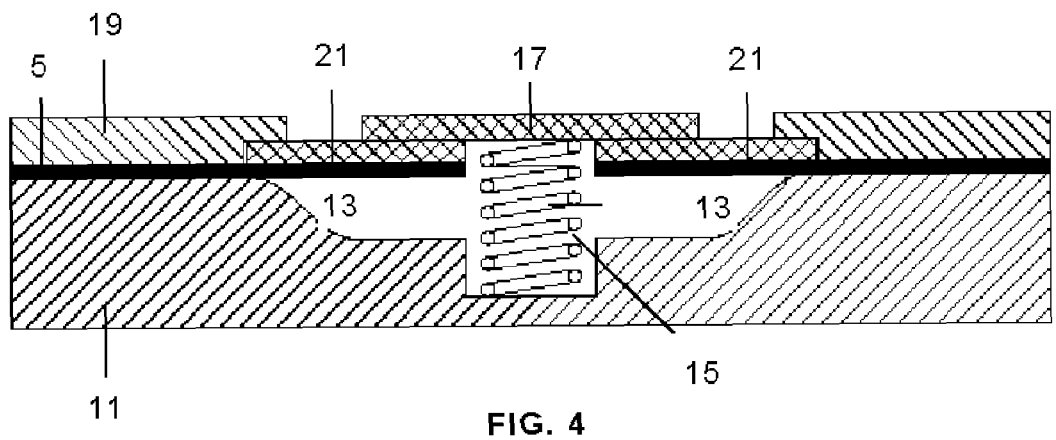
FIG. 4 shows a schematic view of the part and of devices used to carry out the swaged lighting hole process according to this invention upon beginning the process.
Figure 5:
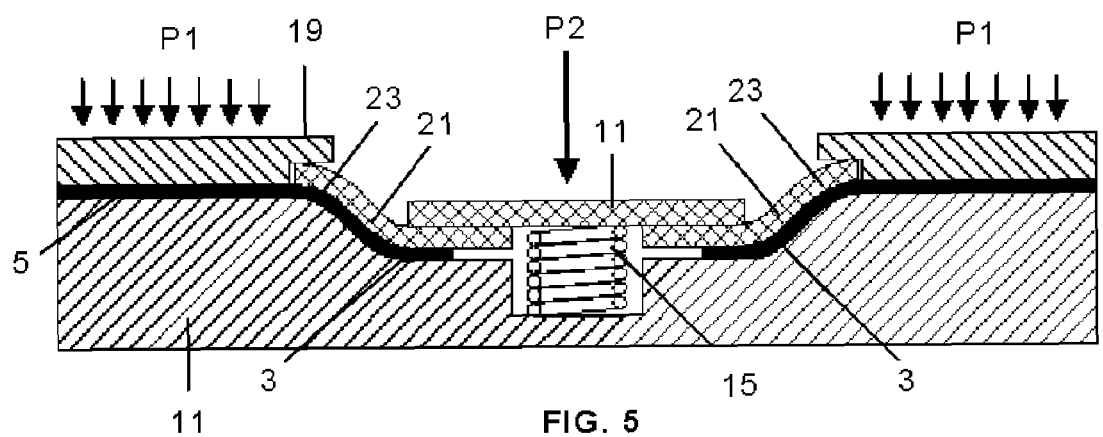
FIG. 5 shows a schematic view of the part and of said devices upon concluding the process.

The male tooling 17 may have the final shape of the swaged lighting hole 1 on its side that is applied on the part 5 or, as is shown in FIGS. 4 and 5, with the part 21 coming into contact with the part 5 made of a deformable material such that it may begin contact with the part in the area 23 where the swaged lighting hole begins and progressively become deformed until exerting pressure uniformly on the area 3 of the part 5 against the cavity 13 of the female tooling 11.

After the foregoing, the swaged lighting hole process is carried out in the following steps:

Applying pressure P1 on the caul plate 19 such that the part 5 is enclosed and compressed between the caul plate 19 and the female tooling 11, preventing the formation of wrinkles.

In the case of using a material preimpregnated with a high viscosity resin, applying heat until achieving the suitable temperature to reduce the resin viscosity, facilitating the slippage of the fibers among one another.

Applying pressure P2 on the male tooling 17 so that it moves on the part 5 at a rate such that it allows the slippage of the fibers inside the part as the geometry of its area 3 evolves until achieving complete adaptation on the female tooling forming the swaged lighting hole 1.

In the case of having heated the part 5 and a subsequent handling being necessary, cooling it to room temperature to return it to its initial consistency.

Any modifications comprised within the scope defined by the following claims can be introduced in the preferred embodiment described above.

The invention claimed is:

1. A process for forming a swaged lighting hole in a planar or quasi-planar area of a part made of a laminate of preimpregnated composite tape containing stiff continuous fibers, said laminate having been produced by means of a tape laying machine, which comprises the following steps:
   a) Arranging the part containing said hole between a female tooling with the final shape of the bottom side of the swaged part and a caul plate with the final shape of the top side of the swaged part, except in the area that must be swaged, which is not covered by the caul plate, and applying pressure on the caul plate throughout the process to prevent the formation of wrinkles on the area of the part that must be maintained substantially planar;
   b) locating a spring within the hole oriented to oppose pressure applied in a direction perpendicular to the female footing;
   c) Applying a male tooling against the resistance of said spring on the area of the part which must be swaged such that the forward speed of said male tooling results in flow of the resin and slippage of the fibers of the material, such that said part can be deformed, adapting to the shape of the female tooling.

2. A process according to claim 1, wherein the part of the male tooling in contact with the part is configured with the final shape of the swaged lighting hole and does not deform during the process.

3. A process according to claim 1, wherein the part of the male tooling in contact with the part is deformable, such that it can exert pressure uniformly on the area of the part which must be swaged to adapt to the shape of the female tooling.

4. A process according to claim 1, wherein it also comprises the application of heat to the part to achieve a temperature in the resin facilitating the slippage of the fibers of the material, and optionally a final cooling step of the part.

* * * * *